Sept. 17, 1946.   H. T. BUDENBOM   2,407,649
DIRECTION FINDING SYSTEM
Filed July 23, 1941   4 Sheets-Sheet 1

INVENTOR
H.T. BUDENBOM
BY
A. J. Zerbarini
ATTORNEY

FIG. IA
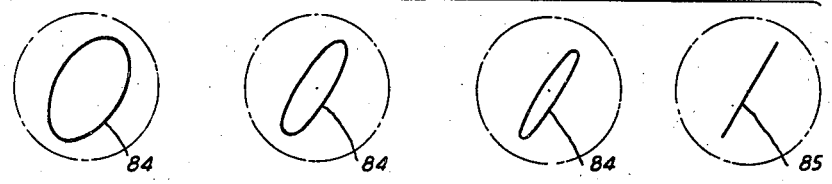
FIG. IB
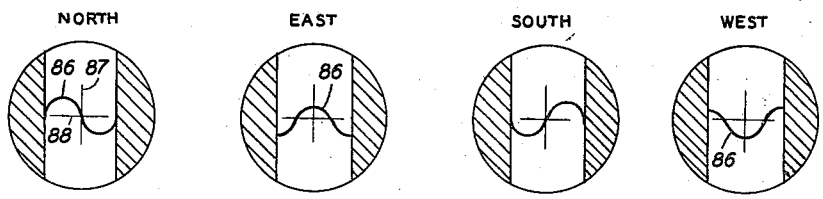

Sept. 17, 1946.    H. T. BUDENBOM    2,407,649
DIRECTION FINDING SYSTEM
Filed July 23, 1941    4 Sheets-Sheet 3

INVENTOR
H. T. BUDENBOM
BY
*A. J. Zerbarini*
ATTORNEY

Sept. 17, 1946.    H. T. BUDENBOM    2,407,649
DIRECTION FINDING SYSTEM
Filed July 23, 1941    4 Sheets-Sheet 4

INVENTOR
H.T. BUDENBOM
BY
ATTORNEY

Patented Sept. 17, 1946

2,407,649

UNITED STATES PATENT OFFICE 2,407,649

DIRECTION FINDING SYSTEM

Horace T. Budenbom, Short Hills, N. J., assignor to Bell Telephone Laboratories, Incorporated, New York, N. Y., a corporation of New York Application July 23, 1941, Serial No. 403,693

9 Claims. (Cl. 250—11)

This invention relates to direction finders and particularly to short wave direction finders.

In my copending application Serial No. 741,372, filed August 25, 1934, there are disclosed a method and means for determining the path or direction of an incoming wave utilizing a pair of spaced vertical antennas mounted on a turntable and connected through separate receivers to a cathode tube phase indicator. Briefly, the method comprises rotating the turntable to a position at which the absorbed antenna energies are in phase agreement whereby the plane of the antennas is perpendicular to the azimuth direction of the incoming wave. It now appears desirable to modify the above-described system and in general to secure, in a phase comparison type direction finder, an instantaneous indication of the wave direction and, in addition, to provide aural balance means for accurately checking or confirming the direction indication obtained.

It is one object of the invention to determine accurately, and substantially instantaneously, the direction of radio waves.

It is another object of this invention to obtain a continuous indication of the direction and directional sense of an incoming wave irrespective of changes in said direction.

It is still another object of the invention to maintain equal gains in the two receiving circuits of an aural balance direction finder.

According to one feature of the invention the turntable of the direction finding system disclosed in the copending application mentioned above is continuously rotated at a given low frequency rate. The in-phase component of the detected audio frequency from one receiver and the quadrature phase component of the detected audio frequency of the other receiver are supplied in conjugate to a push-pull balanced demodulator in the output of which a current having a frequency equal to the rotating frequency and a phase related to the direction and sense of the incoming wave is obtained. The instantaneous amplitude of the rotating frequency current obtained represents the cyclically varying phase relation or difference between the absorbed antenna energies, and this representative current is applied to the horizontal plates of a cathode tube indicator. The current for the horizontal sweep is obtained from a circular potentiometer mounted on a collar slidably associated with the turntable shaft and having a continuously rotating contact arm attached to the shaft. A low frequency elliptical trace is obtained which becomes a straight line upon proper adjustment of the collar. An azimuth scale is attached to the collar for use in determining the compass direction of the incoming wave. As an alternative, a sinusoidal trace may be secured by timing a linear sweep voltage by means of a synchronizing pulse obtained from a rotating contact associated with the turntable shaft. Upon proper adjustment of the collar the zero point of the trace coincides with the reference line on the cathode tube, the positive alternation of the trace being at the left of the line for the front direction and at the right for the back direction whereby the sense as well as the path of the incoming wave is ascertained.

In accordance with another feature of the invention, apparatus is added to the phase comparison direction finding system disclosed in my copending application mentioned above modified or not to include the improvement described above, for continuously maintaining equal gains in the two receiving circuits whereby an aural balance indication may be secured for checking the cathode tube phase comparison indication. More specifically, each receiver is provided with a conventional primary automatic volume control for limiting the variation in gain and with a secondary volume control for further limiting the degree of gain variation. In addition, a differential volume control is provided so that, upon a slight change in the gain of either receiver, the gain of the other receiver is changed in the same sense and to the same degree. Preferably, the various automatic volume control circuits are first calibrated by receiving a wave emitted by the local transmitting antenna and adjusting the two receivers for equal gains. After the initial adjustment the system may be used for obtaining an aural balance indication for a desired wave incoming from a distant station, the indication being obtained by rotating the turntable to the position at which signals having equal amplitudes and equal phases, as measured by head-phones or other indicating means, are obtained in the outputs of the two receivers.

The invention will be more fully understood from a perusal of the folowing specification taken in conjunction with the drawings on which like reference characters denote elements of similar function and on which:

Figs. 1A and 1B are cathode tube indicator traces obtained with the system of Fig. 1;

Figure 1:
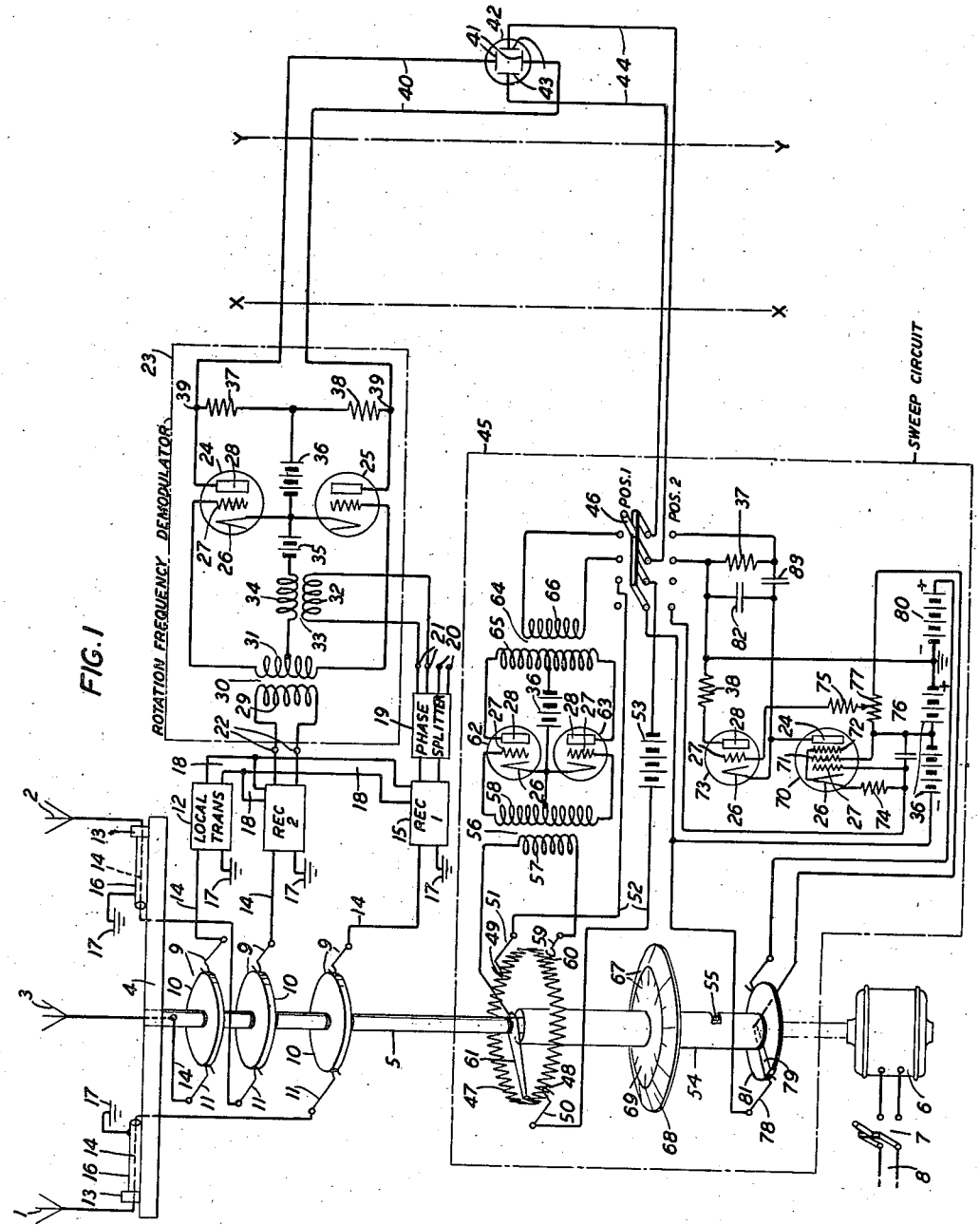
Fig. 1 illustrates one embodiment of the invention for obtaining an instantaneous phase comparison indication.

Referring to Fig. 1, reference numerals 1 and 2 designate non-directional vertical receiving antennas and numeral 3 denotes a local transmitting antenna, the antennas being mounted on a horizontal turntable 4. The turntable is supported by the vertical shaft 5 which is driven or rotated by the motor 6. Reference numeral 7 designates a switch for connecting motor 6 to the power supply leads 8. Antenna 3 is positioned equally distant from, and preferably in the same plane as, antennas 1 and 2 and is connected through a slip-ring assembly comprising the rotating ring or circular contact 9, insulator or insulation 10 and the stationary spring contacts 11, to the local phasing transmitter 12. Antennas 1 and 2 are each connected through an antenna coupling unit 13, unbalanced line conductor 14 and associated slip-ring assembly to a receiver 15, the receiver 15 connected to antenna 1 being hereafter referred to as receiver No. 1 and the receiver 15 associated with antenna 2 being hereafter referred to as receiver No. 2. The horizontal portion of each line conductor 14 is preferably enclosed in a shield 16 which forms with the enclosed portion of conductor 14 an unbalanced coaxial line. The outer coaxial conductor 16 is connected to the ground 17. As explained in my copending application, the local transmitter 3 is connected to receivers 15 by the tuning connection 18 and the local transmitter and both receivers are simultaneously tuned by a unicontrol means at the local transmitter. Reference numeral 19 designates a quadrature phase shifter connected to the output terminal of receiver 1 for the purpose of obtaining at terminals 20 an audio frequency (as 1000 cycles) in-phase potential $F_a$ and at terminals 21 an audio frequency quadrature potential, $F_a$ (90 degrees), the potential $F_a$ and the potential $F_b$ at the output terminals of receiver 2 being the in-phase potentials referred to in the above-mentioned application. As described thus far the system is, except for the addition of the slip-ring assembly, similar to that described and claimed in my copending application mentioned above.

The output terminals 22 of receiver 2 and the quadrature output terminals 21 of receiver 1 are, in accordance with the present invention, connected to the rotation frequency detector 23 which is similar in circuit operation to a vacuum tube wattmeter. The rotation frequency detector comprises tubes 24 and 25 connected in push-pull and each containing a cathode 26, a control electrode or grid 27 and an anode or plate 28. The output terminals 22 of receiver 1 are connected to the primary winding 29 of transformer 30, the secondary winding 31 of which is connected between the grids 27 of tubes 24 and 25; and the quadrature terminals 21 of receiver 1 are connected to the primary winding 32 of transformer 33, the secondary winding 34 of which is included in the common lead connecting the grids 27 of tubes 24 and 25 to the cathode 26. In other words, the in-phase output terminals of receiver 2 and the quadrature phase output terminals of receiver 1 are connected in conjugate in the input circuit of push-pull detector 23. Reference numerals 35 and 36 designate respectively a source of grid bias potential and a source of anode potential and numerals 37 and 38 denote impedances connected respectively in the output circuits of tubes 24 and 25. The output terminals 39 of the rotation frequency detector 23 are connected by line 40 to the horizontal plates 41 of cathode tube indicator 42. The sweep or reference voltage applied to cathode tube plates 43 is obtained over line 44 from the sweep circuit 45.

The sweep circuit 45 includes two distinct sources of sweep voltage either of which may be connected by the double-throw switch 46 to the plates 43. Assuming switch 46 is in position No. 1, as shown on the drawing, one source supplies a sinusoidal current of the rotation frequency and comprises the circular potentiometer 47, the diametrically opposite points 48, 49 of which are connected, respectively, through contacts 50, 51, switch 46 and connections 52 to the opposite terminals of battery 53. The potentiometer 47 is rigidly attached to the movable sleeve 54 which may be manually rotated about shaft 5 and locked in a given position by means of a conventional slot and spring plunger assembly 55. Reference numeral 56 designates a transformer having primary winding 57 and secondary winding 58. The primary winding is connected through contact 59 to a point 60, equally spaced from points 48 and 49, on potentiometer 47, and to radial arm contact 61 which rotates with shaft 5 and sweep potentiometer 47. The secondary winding 58 is connected to the input circuit of a push-pull amplifier comprising tubes 62 and 63. Reference numeral 64 denotes a transformer the primary winding 65 of which is included in the output circuit of the push-pull amplifier 62, 63 and the secondary winding 66 of which is connected to switch 46. Numeral 67 designates a conventional azimuth scale assembly comprising the stationary azimuth scale 68 and the rotatable angle scale 69 attached to the sleeve 54. As explained below, the cathode tube trace obtained is either an ellipse or a straight line.

The alternative source of sweep voltage utilized with switch 46 in position No. 2 is essentially a linear sweep circuit controlled by periodic pulses synchronized with the turntable rotation. Reference numeral 70 designates a linear sweep shaping tube having a cathode 26, a control electrode 27, screen grid electrode 71, suppressor grid electrode 72 and an anode 28 and reference numeral 73 designates a gas-filled trigger tube having a cathode 26, control grid 27 and an anode 28, the tubes being connected in series. Numerals 74 and 75 designate respectively resistances included in the control grid circuits of tubes 70 and 73 and the numeral 76 designates a by-pass condenser. The screen grid 71 of tube 70 and the control grid 27 of tube 73 are connected through resistance 77, spring contact 78 and rotating contact 79 to the positive terminal of an auxiliary battery 80. The radial arm 79 is preferably mounted on or embedded in the circular insulator 81 which is attached to sleeve 54. The anode circuit of tube 70 includes a condenser 82, which is connected through switch 46 to the horizontal cathode tube plates 43, and a shunt path comprising a resistance 37 and condenser 83 in series therewith. Condenser 82 is also shunted by the series path comprising anode resistance 38 and the anode-cathode path of trigger tube 73. The sweep circuit comprising tubes 70 and 73 and including the radial contact 79 is essentially the same as that disclosed in the RCA Tube Handbook (tube 884).

In operation, Fig. 1, wave components incoming from the distant station and from the local transmitting antenna are, as explained in the copending application mentioned above, intercepted by antennas 1 and 2 and detected currents $F_a$ and $F_b$ of a constant audio frequency are obtained respectively in the output circuits of receivers 1 and 2, these components having a phase relation for a given orientation of the turntable related to the direction of the incoming wave. In accordance with the present invention the turntable is rotated at a very low speed, for example, one to five revolutions per second, by motor 6 and shaft 5, and as a result the phase relation of the radio frequency components of the incoming distant wave intercepted by antennas 1 and 2, and correspondingly the phase relation of the two detected currents, are cyclically varied at a rate equal to the rotation frequency. Thus, when the plane of antennas 1 and 2 is perpendicular to the incoming wave direction the detected currents are in phase, and when the plane is aligned with the wave direction they have a maximum phase difference. In other words, during each revolution of the turntable the phase relation between the detected currents passes through a zero value twice and through a maximum or unity value twice. A portion of the output of receiver 1 is shifted 90 degrees by phase splitter 19 and supplied, as previously indicated, with the in-phase output of receiver 2 to the conjugate input circuit of rotation frequency detector 23.

As disclosed in Patents 1,586,533 and 2,006,698 to E. Petersen, granted respectively June 1, 1926, and July 2, 1935, the output voltage of the vacuum tube wattmeter or push-pull detector 23 is proportional to the product of the two input voltages multiplied by the cosine of the phase angle between them. When the plane of the antenna is perpendicular to the direction of the incoming wave the phase angle between the potentials impressed on grids 27 of tubes 24 and 25 is 90 degrees, the cosine of which angle is zero, and the output potential is a minimum. When the plane is aligned with the wave direction the phase angle differs from 90 degrees by a maximum amount whereby the output potential is a maximum. Hence, there is obtained at terminals 39 and at horizontal plates 41 of cathode tube 42 a sinusoidal signal voltage having a frequency equal to the rotation frequency, an instantaneous amplitude representing the cyclic variation in the phase relation of the above-mentioned absorbed antenna energies and an absolute phase or phase angle related to the direction and sense of the incoming wave. Upon a change in the direction of the incoming wave the phase angle of the detected signal current is altered, the frequency and amplitude remaining unchanged. Stated differently, upon a wave direction change the sinusoidal wave is shifted on its time axis, with respect to a given point on said axis, an amount related to the angular change in the horizontal wave direction.

Assuming switch 46 is in position No. 1, the potential from battery 53 supplied through contacts 59 and 61 and winding 57 is cyclically varied, a polarity reversal being obtained in effect when arm 61 crosses point 60. This sinusoidal reference potential is applied to the vertical plates 43 of tube 42 and, as illustrated by Fig. 1A, a low frequency elliptical pattern 84 is obtained when the potentials have an out of phase relation other than 180 degrees and a straight line trace 85 is secured when the phase angle difference of the potentials is zero (or 180 degrees). If the trace is elliptical the sleeve 54 may be adjusted until a straight line indication is secured and the angle between the wave line direction and the chosen reference line direction, as, for example, north-south, may be ascertained by observation of the azimuth scale 67. The adjustment of sleeve 54 changes for a given orientation of the turntable 4, the position of the radial arm 61 relative to points 48, 49 and 60 and hence shifts the absolute phase of the reference or sweep voltage.

Alternatively, switch 46 may be thrown to position No. 2 for the purpose of obtaining both a path indication and a sense indication. Assuming contacts 78 and 79 are open when the switch 46 is thrown to position No. 2, the anodes of tubes 70 and 73 become immediately energized with positive potential and condenser 82 begins charging. Since the flow of current from the anode 28 to the cathode 26 of tube 73 is blocked by the relatively low positive potential on control grid 27 obtained from battery 36, the current from battery 36 flows through condenser 82 and tube 70 and not through tube 73. The voltage across condenser 82 is increased gradually, relatively considered, and since this voltage is applied to plates 43 of cathode tube 42 the cathode beam is simultaneously caused to sweep horizontally in one direction during one revolution of shaft 5. When contacts 78 and 79 close, a high positive potential obtained from auxiliary battery 80 is impressed through these contacts and resistances 77 and 75 on the control grid 27 of tube 73 whereupon trigger tube 73 becomes conductive and condenser 82 abruptly discharges through the anode-cathode path of tube 73. At the same time the screen grid 71 of the shaping tube 70 is rendered more positive so that the discharge of condenser 82 is accelerated, the function of the shaping tube 70 and associated circuits being to transform in effect the normal exponential discharge characteristic of condenser 82 to a linear characteristic and to secure an ideal saw-tooth sweep.

As illustrated by Fig. 1B, with the switch 46 in position No. 2, a sinusoidal trace is obtained, the position of the positive alternation 86 relative to reference lines 87 and 88 being indicative of the direction and sense of the incoming wave. Thus, for example, as shown in Fig. 1B, for the "front" direction the positive alternation 86 is at the right of the vertical reference line 87 and above the horizontal reference line 88 whereas for the "back" direction it is at the left of line 87 and above line 88. For the side directions perpendicularly related to the in-phase direction, it is symmetrically disposed relative to line 87 but is above line 88 for the right-hand side direction and below line 88 for the left-hand side direction. The sinusoidal trace may be shifted and the azimuthal bearing ascertained by adjusting sleeve 54 and the arm 79 attached thereto, and noting the azimuth scale.

Figure 2:
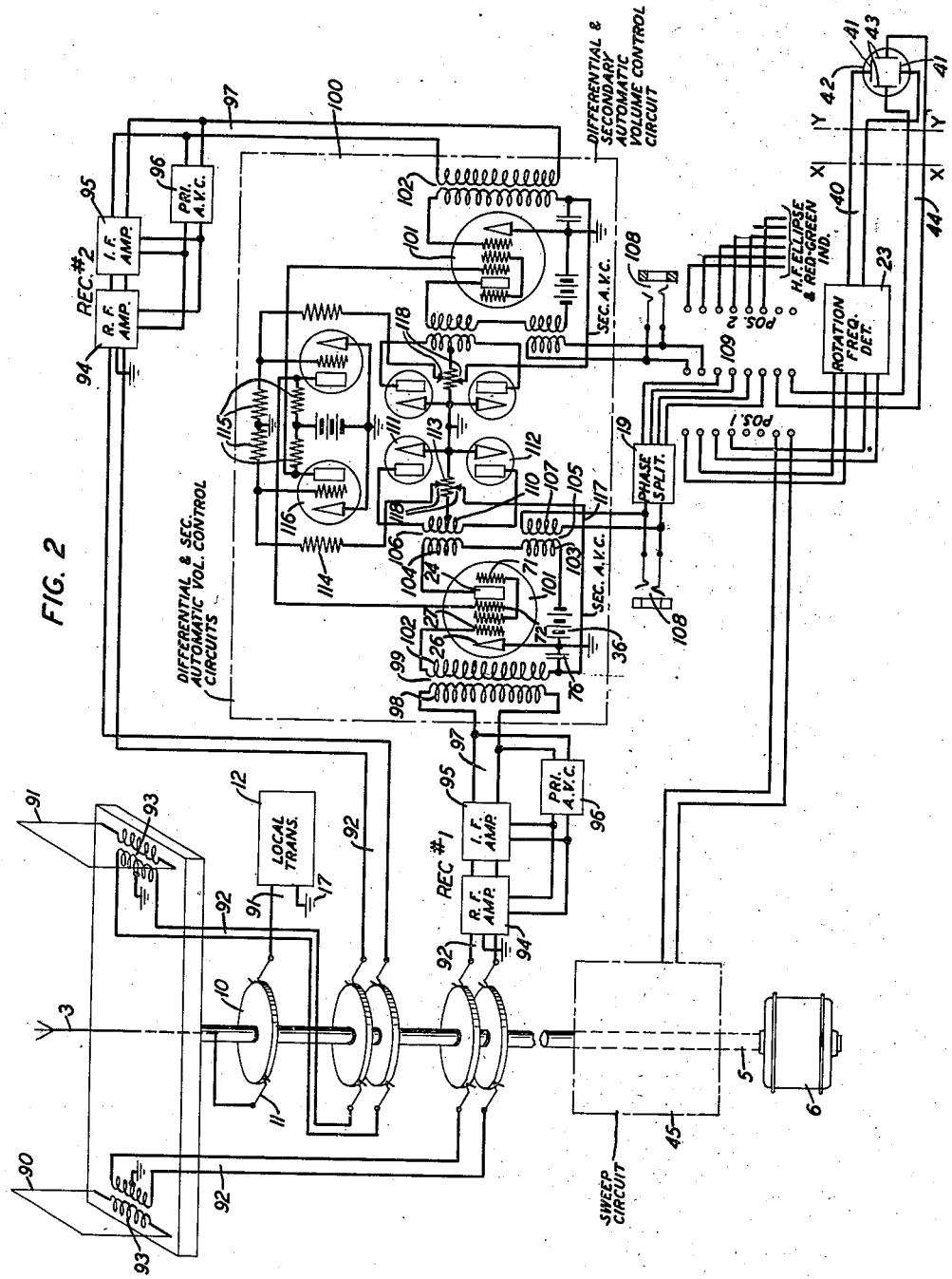
Fig. 2 illustrates an embodiment of the invention for obtaining visual and aural indications of the direction of the incoming wave.

Fig. 2 illustrates a system which includes substantially the system of Fig. 1 and, in addition, is provided with means for maintaining equal gains in the two receivers and for securing an aural balance. Reference numerals 90 and 91 designate parallel loop antennas and numerals 92 designate balanced transmission lines each of which is connected to its associated loop antenna through the transformer 93. The parallel loop and balanced line arrangement which is used in place of the vertical antenna and unbalanced line arrangement included in the system of Fig. 1, functions in such a way as to eliminate the so-called "night effect," as explained on pages 221, 385, 386 and 389 of the text-book "Wireless Direction Finding," third edition, by R. Keen, since the two loops present the same relative aspect to the wave at all times. Loops 90 and 91 are connected, respectively, to receivers 1 and 2 each comprising the radio frequency amplifier 94 and intermediate frequency amplifier 95, a portion of the output of which is supplied to a conventional automatic volume control circuit 96 hereinafter referred to as the "primary" automatic volume control.

Considering each of receivers 1 and 2, the greater portion of the intermediate frequency output of amplifier 95 is supplied over line 97 and primary winding 98 of transformer 99 to a differential and secondary automatic volume control circuit 100. Numeral 101 designates a pentode tube having its input terminals connected to the secondary winding 102 of transformer 98 and its output terminals connected to the primary windings 103 and 104, respectively, of transformers 105 and 106. The secondary winding 107 of transformer 103 is connected to an individual headphone jack 108 and to switch 109, a phase splitter 19 being included as in the system of Fig. 1 in the output circuit of receiver 1. In each receiver the secondary winding 119 of transformer 106 is connected to a full wave volume control rectifier comprising tubes 111 and 112 and a volume control resistance 113 included in the circuits of the two rectifiers. Numerals 114 and 115 designate respectively a series resistance and a shunt resistance connected together with resistance 113 in the grid circuit of the differential tube 116. The anode 28 of tube 116 in each receiver is connected to the suppressor grid 72 of tube 101 in the other receiver. Resistance 113 is also connected by lead 117 to the control grid of tube 101 of the associated receiver. Hence resistance 113 constitutes a source of direct current voltage for the differential automatic volume control circuit and a source of direct current voltage for the secondary automatic volume control circuit.

In operation, with switch 109 in position No. 1, the two receivers are connected to the reference generator or horizontal sweep circuit 45 and to the rotation frequency detector 23 for the purpose of obtaining an instantaneous or snap bearing indication, as explained in connection with Fig. 1. With the switch 109 thrown, to position No. 2 the receivers are connected, as explained in my copending application mentioned above, to apparatus for obtaining a high frequency ellipse indication or a red-green visual indication. An aural balance may, of course, be obtained by means of head-phones connected to jacks 108, with switch 109 in either position. It should be noted that the systems of Figs. 1 and 2 are phase-comparison systems and that in so far as the cathode tube indications are concerned, the primary difference between the two arrangements is that in the system of Fig. 1 the outputs of two single non-directional antennas are compared as to phase, whereas in the system of Fig. 2 the total outputs of two loop antennas are compared as to phase.

Referring particularly to the volume control circuit 100 the rectified voltage drop across resistance 113 in receiver 1 functions, as is well known, to vary inversely the gain of tube 101 in receiver 1 with variable signal, the gain being decreased as the input signal intensity increases and vice versa. Preferably, the primary automatic volume control circuit 96 limits the variation in gain to approximately 3 decibels and the secondary automatic volume control 117 further limits the variation in gain to approximately ½ decibel or less. Also, since the voltage drop across resistance 113 connected to the full wave rectifier 111, 112 of receiver 1 is impressed through tube 116 on the suppressor grid of tube 101 of receiver 2, and similarly the drop across resistance 113 included in receiver 2 is impressed through the tube 116 on the suppressor grid of tube 101 of receiver 1, whenever the gain of either receiver is altered the gain of the other receiver is adjusted in the same sense and to the same degree. Hence the gains of the two receivers are maintained alike and an accurate amplitude balance may be obtained. While the gains are maintained equal, each varies inversely as the intensity variation or fading of the incoming distant wave. If desired, the two receivers may first be calibrated for equal gain control operation by receiving the wave locally emitted by antenna 3 and adjusting the contacts 118 on resistance 113, the transmitter 12 being adjusted so that the frequency of the locally emitted calibrating wave is the same as the frequency of the desired incoming wave. After preliminary calibration the frequency of the local transmitter is readjusted to produce the detected frequencies $F_a$ and $F_b$ which are utilized in the aural null determination.

The aural null indication is obtained in a manner well known in the art. Briefly considered, with switch 109, Fig. 2, in position No. 1 the bearing of the distant station, as given by the tube indicator 42, is noted and the automatic or continuous rotation of the turntable is stopped. The turntable is then manually rotated as explained in my copending application mentioned above, to the position at which the line or axis connecting corresponding points in the two receiving antennas, is perpendicular to the line direction of the incoming wave whereby a phase balance is obtained. As explained above, the volume control circuits in the two receivers are then adjusted to obtain an amplitude balance. With the system adjusted for both a phase balance and an amplitude balance the audible indications obtained in the ear pieces connected to jacks 108 are balanced.

Figure 3:
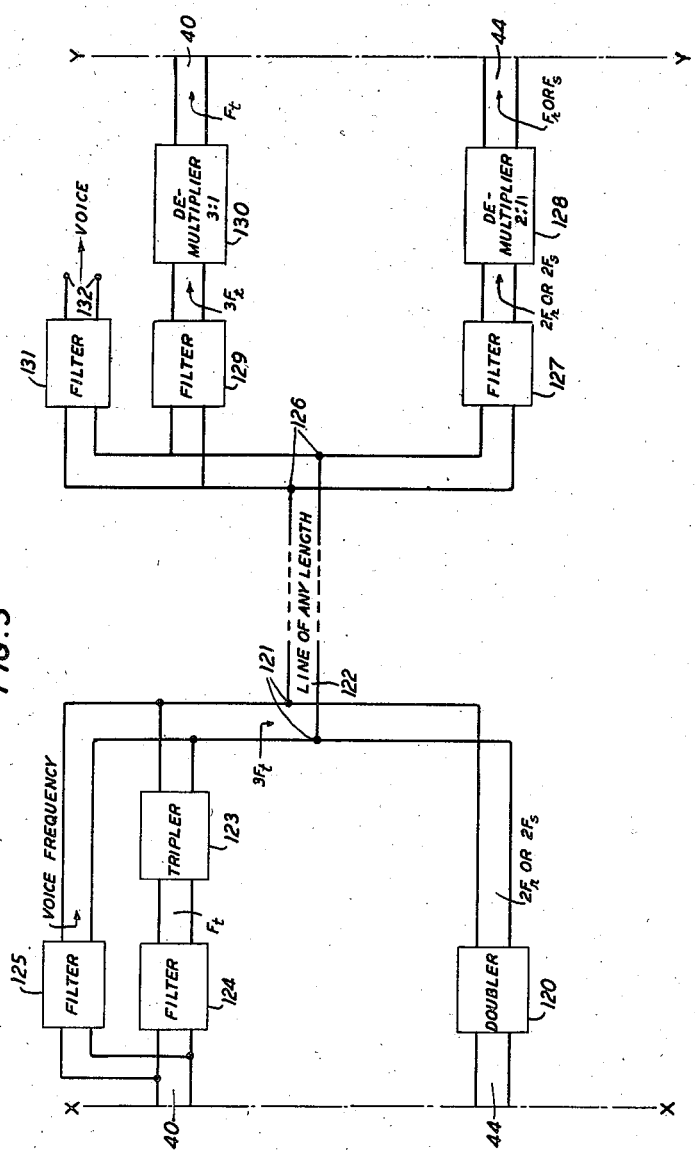
Fig. 3 illustrates a remote indicating arrangement which may be used with the systems of Figs. 1 and 2.

Fig. 3 illustrates apparatus which may be added to the systems of Figs. 1 and 2 for obtaining at a cathode tube indicator located many miles from the turntable either the low frequency elliptical directional pattern, Fig. 1A, or the sinusoidal pattern, Fig. 1B. For remote indication operation, the apparatus of Fig. 3 is inserted, as indicated by the dot-dash lines X—X and Y—Y, Figs. 1, 2 and 3, in transmission line 40 conveying the signal current frequency $F_t$ and transmission line 44 conveying the reference or horizontal sweep current $F_r$ or $F_s$ to the cathode tube indicator. Referring to Fig. 3, the reference line 44 is connected through a frequency doubler 120 to the input terminal 121 of the long two-wire telephone line 122 and the line 40 is connected to terminals 121 through the two parallel paths, one including the frequency tripler 123 and the voice frequency blocking filter 124 and the other including the voice frequency path filter 125. As is apparent, line 122 conveys a sweep reference current of double frequency ($2F_R$ or $2F_s$) and a signal current of triple frequency $3F_T$. The output terminals 126 of line 122 are connected to the horizontal deflecting plates 43 of the indicator 42 through the filter 127, which blocks the passage of voice frequency current and the triple signal current $3F_T$, and through the 2 to 1 frequency demultiplier 128. Terminals 126 are also connected through the filter 129, which blocks the voice frequency current and the reference double frequency ($2F_R$ or $2F_s$), and through the 3 to 1 demultiplier 130, to the vertical deflecting plates 41 of the cathode tube 42. The demultipliers 128 and 130 function, respectively, to reduce the sweep and signal currents to their original frequency so that the frequency applied to the cathode tube is the same as that used in a local indicating system of Figs. 1 and 2. The demultipliers may be of any conventional type and preferably are of the type described in the article by R. L. Miller entitled "Fractional-frequency generators" published in the Proceedings of the I. R. E., July 1939, page 446. A voice frequency pass filter 131 is included between the line terminals 126 and the output terminals 132. The voice frequency pass filters 125 and 131 and associated shunt paths permit transmission of the voice frequencies through the system of Fig. 3 without frequency change.

Although the invention has been described in connection with certain specific embodiments thereof, it is to be understood that it is not to be limited to these embodiments and that other apparatus may be successfully used in practicing the invention without exceeding the scope of the invention.

What is claimed is:

1. A direction finder comprising a pair of electrically independent spaced antennas for obtaining separate radio frequency energies from an incoming wave, said antennas being positioned on a turntable, means for rotating the turntable, and producing a cyclically varying phase difference between the absorbed antenna energies, means connected to said antennas for obtaining a current representing the amount and sense of said phase difference, and means for comparing the phase angle of said current with that of a current representing a predetermined reference direction.

2. A direction finder comprising a pair of receiving channels, each including an independent antenna, for obtaining a pair of currents representing components of the received wave, means for cyclically moving said antennas at a given frequency in opposite directions with respect to a distant transmitter, means for obtaining from said pair of currents a sinusoidal current having a frequency equal to said frequency, an amplitude representing the phase angle relation of said pair of currents and a phase angle representing the direction and sense of said wave, and means for comparing the phase angle of said current with that of a current representing a predetermined reference direction.

3. A direction finder comprising a pair of independent spaced antennas for receiving a given wave, means common to said antennas for cyclically and oppositely moving said antennas along the path of said waves, means comprising a modulator connected through separate receivers to said antennas for obtaining a current having a phase angle representing the direction and sense of said waves and representing the phase relation between the antenna energies, means for obtaining a current having a phase angle related to a reference direction, and means for determining the phase angle relation of said currents.

4. A direction finder comprising a pair of spaced vertical loop antennas for receiving a given wave, said antennas being positioned in parallel planes and mounted on a turntable for rotation at a given rate in a horizontal plane, means comprising separate receivers and connected to said antennas for obtaining a current from the antenna energies having a frequency dependent upon the turntable speed and a phase related to the direction of the incoming wave, means for obtaining another current having a phase related to a reference direction and means for comparing the phases of said currents.

5. A direction finder comprising a pair of spaced independent antennas mounted on a turntable and positioned to receive a particular incoming wave, separate detecting means connected to each antenna for obtaining currents representing the antenna energies, modulating means connected to said separate detecting means for obtaining from said currents a third current having a frequency equal to the turntable speed and a phase angle related to the direction of said wave, generating means for obtaining a fourth current having a phase angle related to a reference compass direction, and means for determining the phase angle relation between the third and fourth currents, whereby the direction and sense of the incoming wave may be ascertained.

6. A direction finder comprising a pair of antennas spaced for receiving equal intensity components of an incoming wave, substantially, separate receivers connected to said antennas and having independent primary automatic gain control circuits, an indicator connected to the output of said receivers, and means for compensating for the difference in the gain of said receivers comprising a pair of secondary gain control circuits each having its input terminals connected to a different one of said receivers and its output terminal connected only to the other receiver.

7. A direction finder comprising two antennas mounted on a turntable and spaced for receiving from an incoming wave components having similar fading characteristics, said antennas being positioned along a horizontal line perpendicularly related to the vertical plane containing the desired incoming wave, separate receivers each including an amplifier and an independent automatic gain control circuit therefor, an aural indicator connected to said antennas, and a differential gain control means for changing the gain of either amplifier upon a change in the gain of the other amplifier, said means comprising a pair of rectifiers each of which is connected between the output circuit of a different amplifier and only the input circuit of the other amplifier.

8. A method of determining the direction of an incoming wave which comprises receiving separate components of said wave, producing in the phase-angle relation of the received components a cyclic variation related to the wave direction, intermodulating said components to obtain a sinusoidal current having a phase angle representing said variation and said direction, obtaining a second current having a phase angle representing a reference direction and comparing said phase angles.

9. A method of determining the compass point direction of an incoming wave, utilizing a pair of spaced antennas, which comprises receiving on said antennas a pair of separate components of said wave, oppositely moving said antennas at a given cyclic rate relative to said direction to produce a cyclic variation in the phase-angle relation of said received components, obtaining from the received antenna energies a pair of currents having the same cyclic variation in their phase-angle relation, modulating said currents to produce a sinusoidal current having a frequency equal to said rate and a phase angle representing said direction, obtaining a reference current having a frequency equal to said frequency and a phase angle representing the reference direction and comparing the phase angles of said last-mentioned currents.

HORACE T. BUDENBOM.